United States Patent
Guldevall

(10) Patent No.: US 7,304,779 B2
(45) Date of Patent: Dec. 4, 2007

(54) DEVICE FOR CONVERTING LIGHT

(75) Inventor: Ulf Guldevall, Taby (SE)

(73) Assignee: Elinnova HB, Taby (SE)

( * ) Notice: Subject to any disclaimer, the term of this patent is extended or adjusted under 35 U.S.C. 154(b) by 181 days.

(21) Appl. No.: 10/534,391

(22) PCT Filed: Oct. 28, 2003

(86) PCT No.: PCT/SE03/01665

§ 371 (c)(1),
(2), (4) Date: Oct. 21, 2005

(87) PCT Pub. No.: WO2004/044641

PCT Pub. Date: May 27, 2004

(65) Prior Publication Data

US 2006/0109556 A1    May 25, 2006

(30) Foreign Application Priority Data

Nov. 11, 2002  (SE)  .................................... 0203323

(51) Int. Cl.
*G02B 26/08* (2006.01)
(52) U.S. Cl. ........................................ 359/216; 359/220
(58) Field of Classification Search ................ 359/216, 359/220

See application file for complete search history.

(56) References Cited

U.S. PATENT DOCUMENTS

| | | | |
|---|---|---|---|
| 2,891,437 A | 6/1959 | Tripp | |
| 4,830,445 A | 5/1989 | Robinson | 350/3.85 |
| 4,968,126 A | 11/1990 | Johnson | 350/620 |
| 5,114,217 A * | 5/1992 | Beiser | 359/216 |
| 5,118,922 A | 6/1992 | Rothe | 250/201.2 |
| 5,644,400 A | 7/1997 | Mundt | 356/400 |
| 2001/0000124 A1 | 4/2001 | Kollin et al. | |

FOREIGN PATENT DOCUMENTS

| | | |
|---|---|---|
| DE | 10106079 | 8/2002 |
| SU | 1223092 | 4/1986 |

* cited by examiner

*Primary Examiner*—Ricky Mack
*Assistant Examiner*—William C Choi
(74) *Attorney, Agent, or Firm*—Dowell & Dowell, PC

(57) ABSTRACT

A device for converting light from, for example, a laser, VCSEL (vertical cavity surface emitting laser) or light emitting diode/diodes to a plane of propagation, comprising a collimated or focused light emitter, characterized in that a full or a portion or several portions of a rotational symmetrical double reflecting component is fixedly provided coaxially in the path of beams from the collimated or focused light emitter so that the light is deflected in a desired angled plane of propagation which extends up to 360° around the double reflecting component.

8 Claims, 12 Drawing Sheets

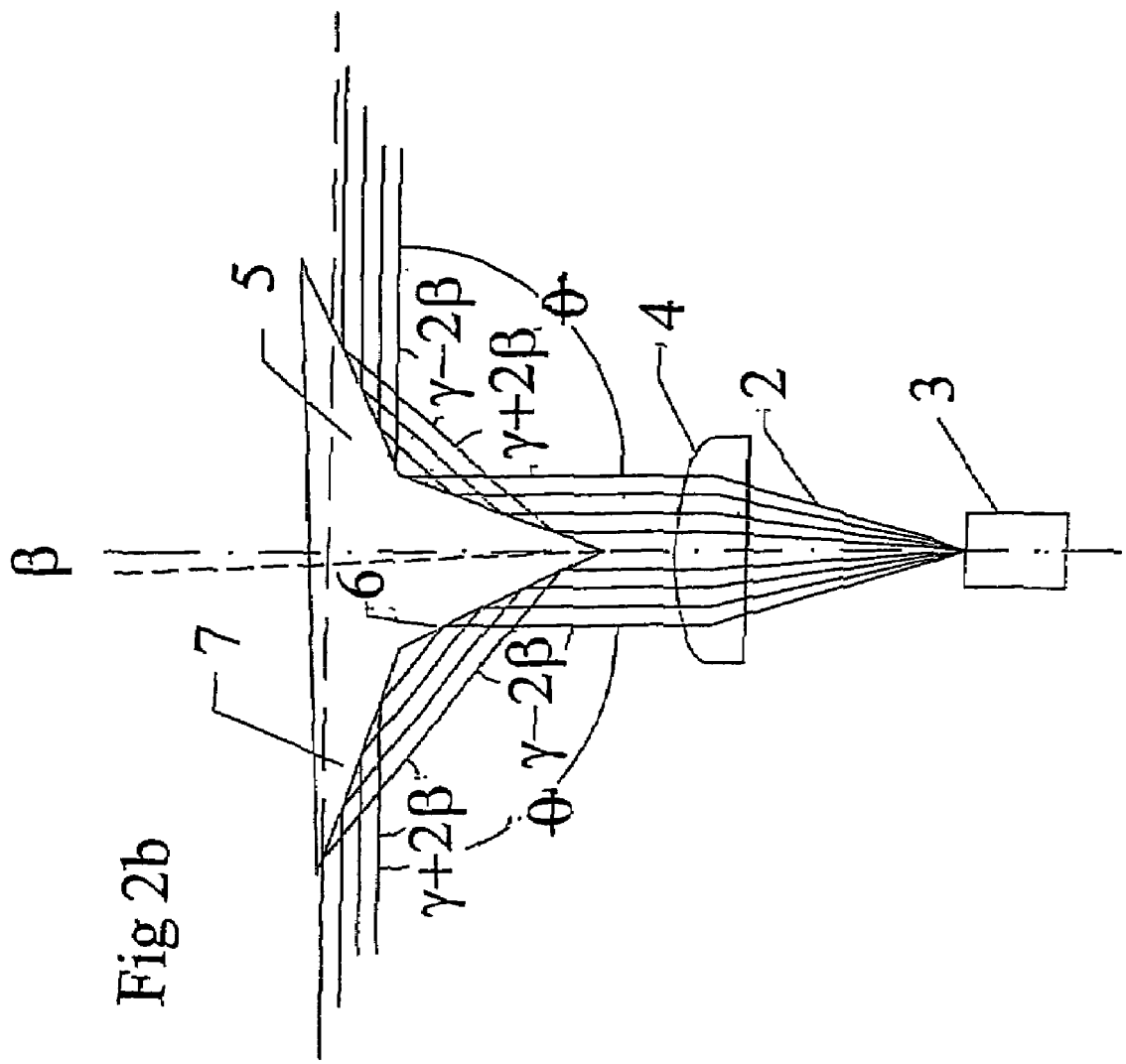

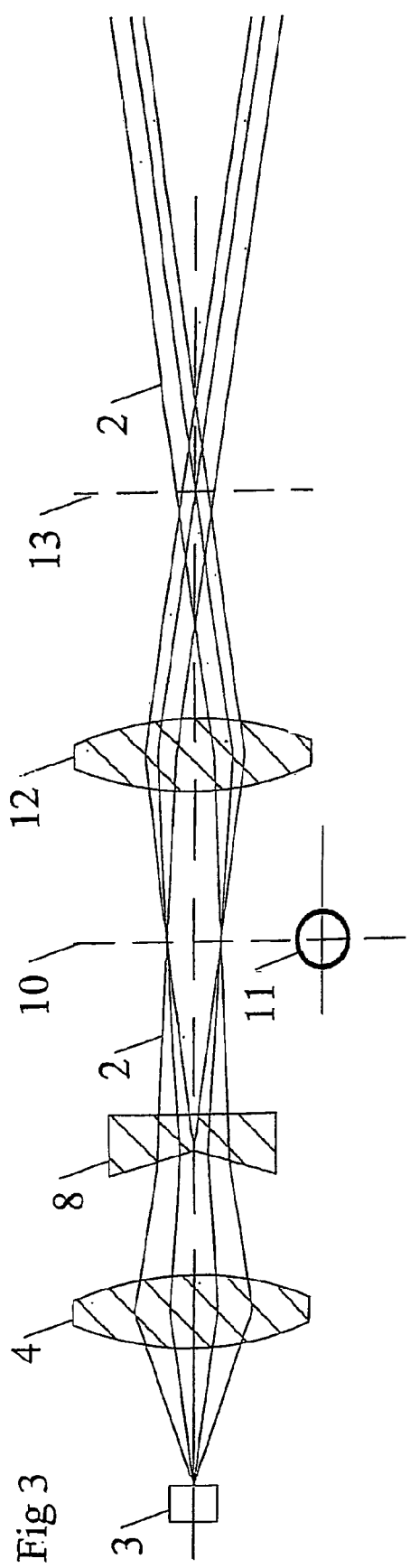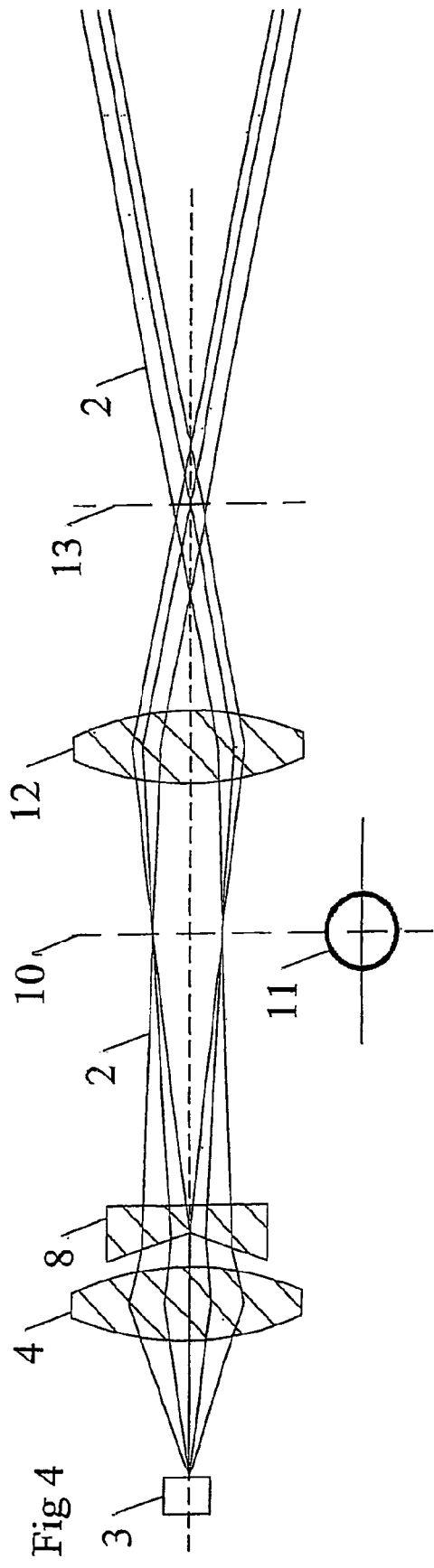

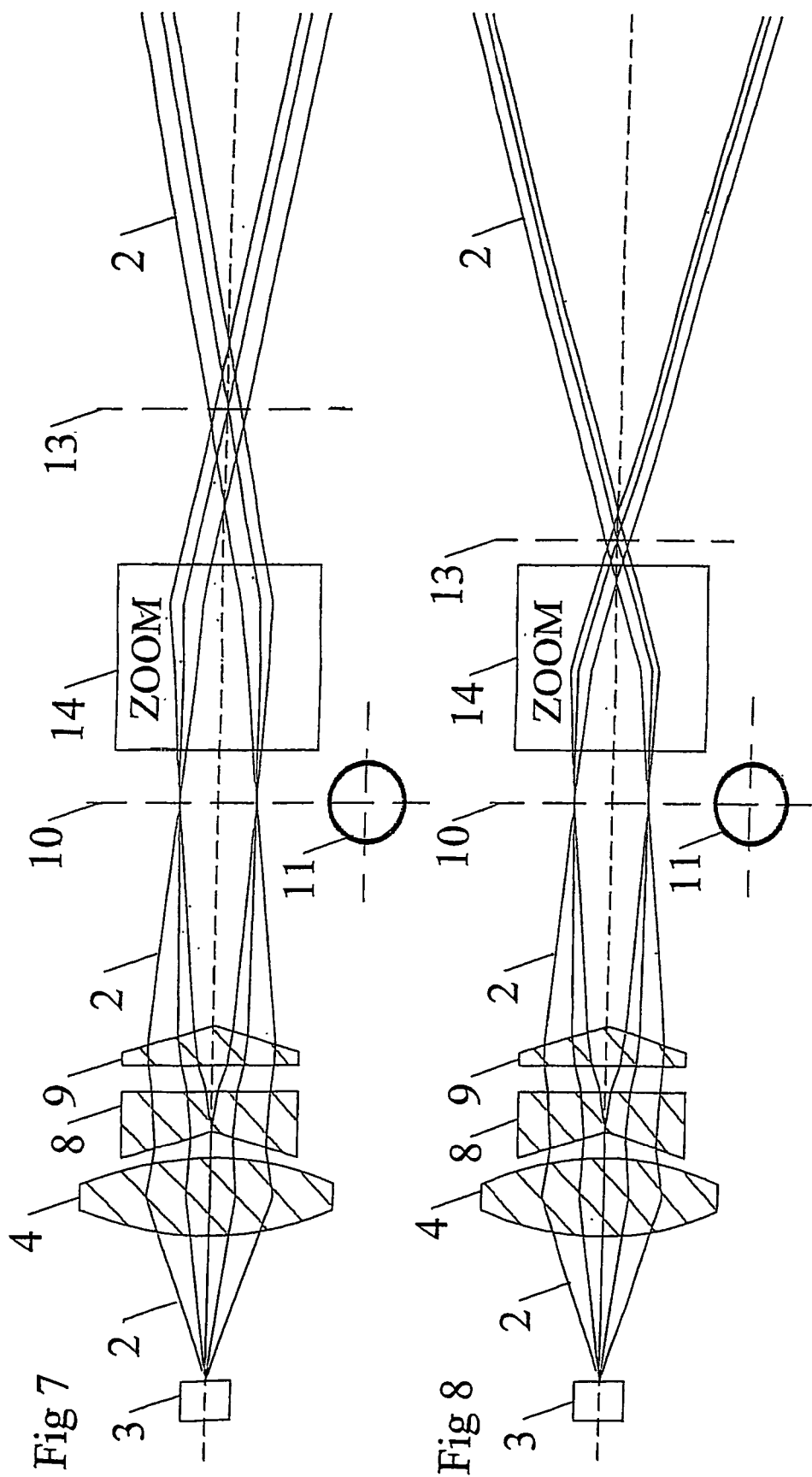

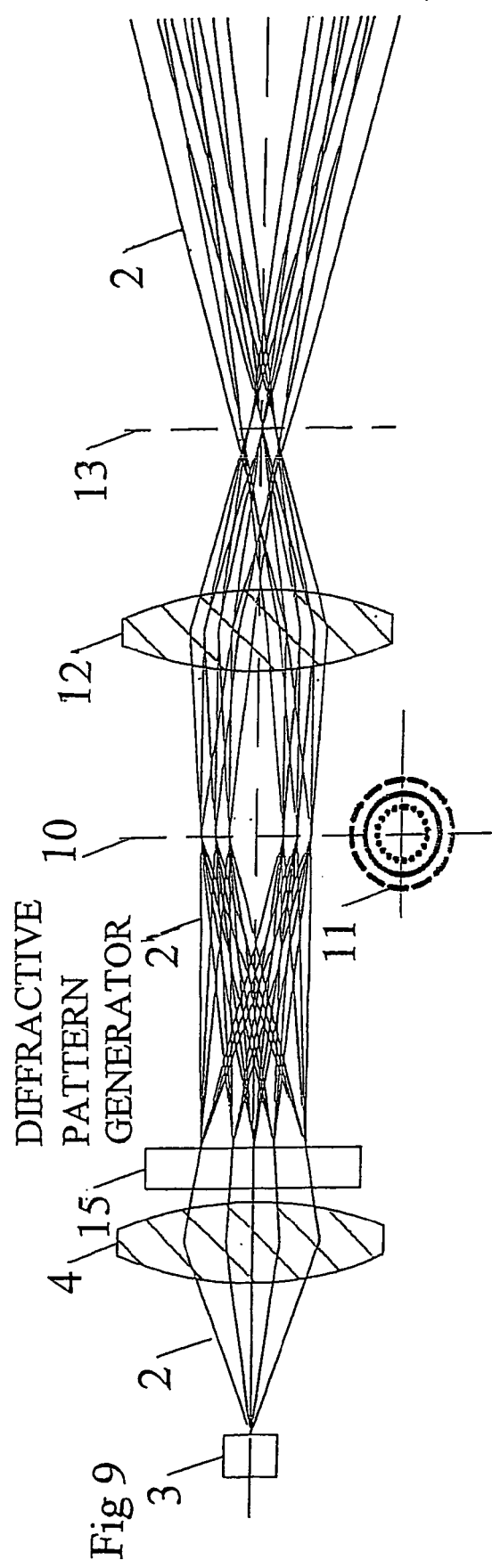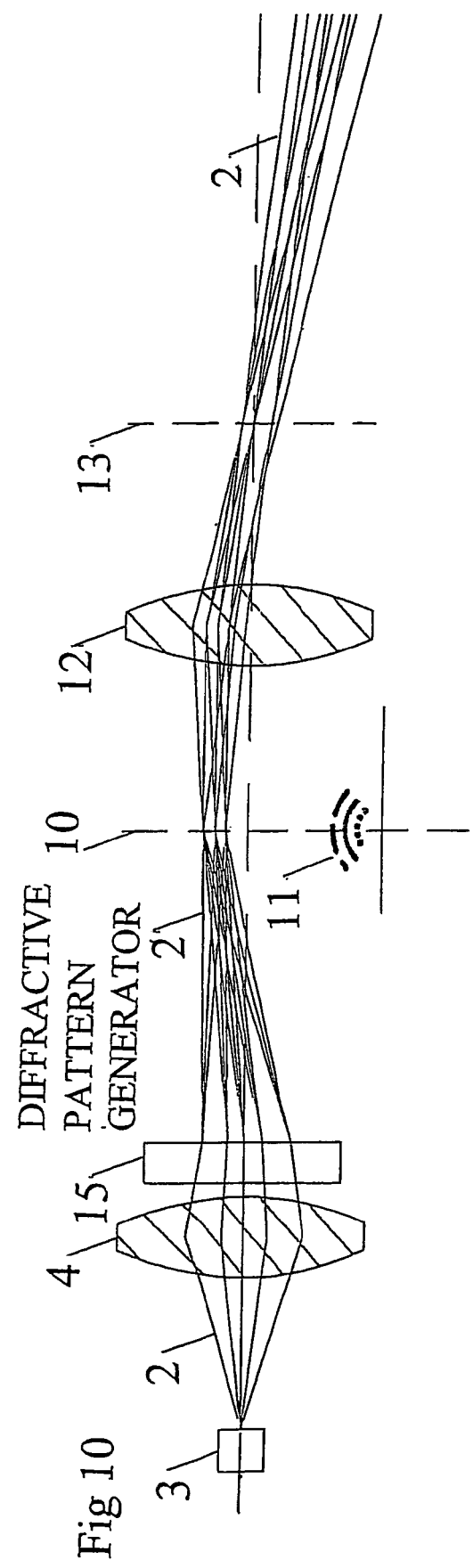

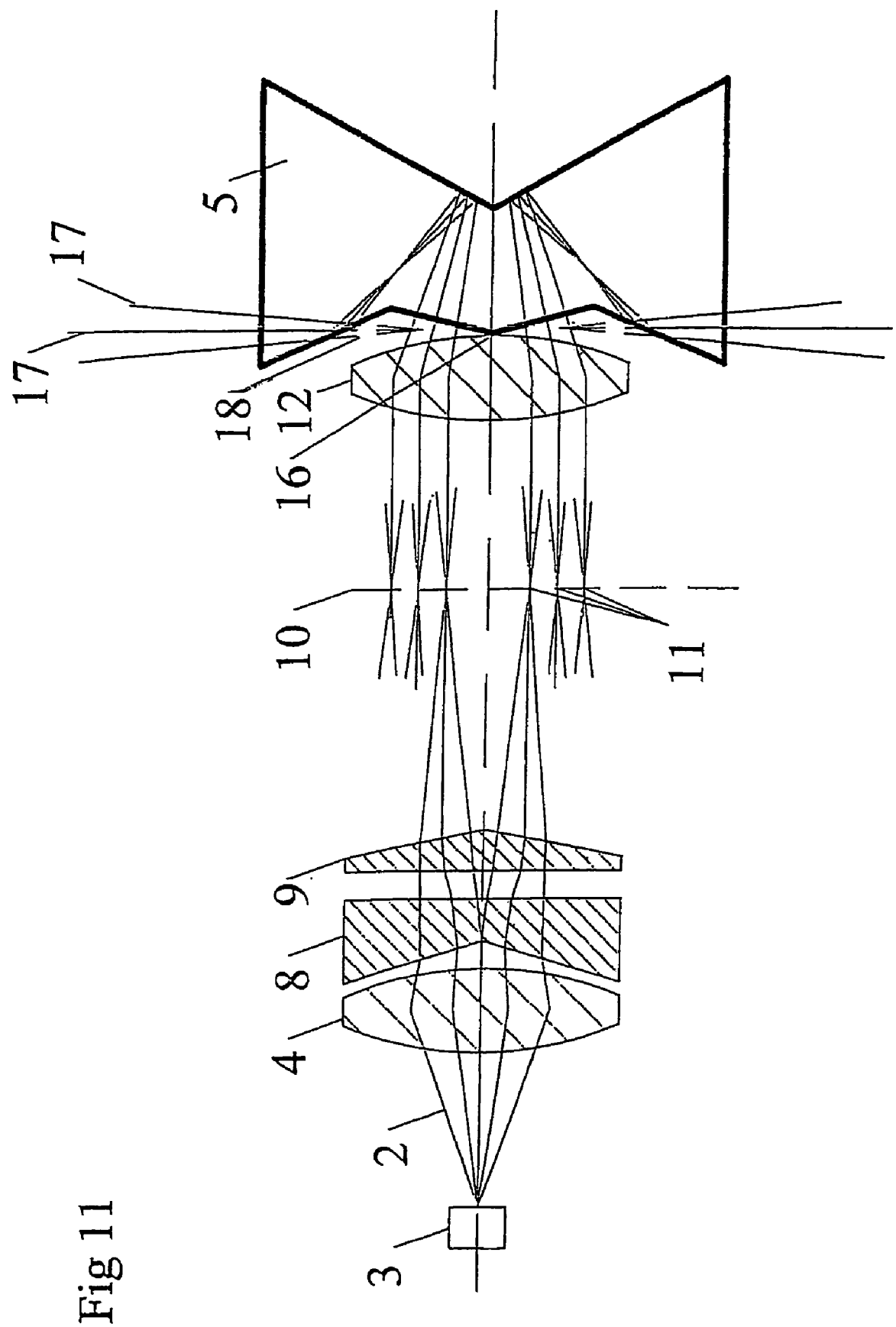

DEVICE FOR CONVERTING LIGHT

CROSS REFERENCE TO RELATED APPLICATIONS

This application is a National Phase of PCT Application PCT/SE2003/001665 filed Oct. 28, 2003 in the name of Ulf Guldevall entitled, DEVICE FOR CONVERTING LIGHT.

The present invention concerns a device for converting light from, for example, a laser, VCSEL (Vertical cavity surface emitting laser) or LED/-s to a plane of propagation comprising a collimated or focused light emitter.

The device is adapted for, for example, usage for generating a plane of light, which either can be totally flat or conical in a desired degree upwards or downwards. Such devices are used for example at construction works, road construction work and the like.

BACKGROUND ART

This has previously been solved by means of a device with a light source whose light beam has been angled by means of a rotating prism or mirror, which rotates 360° so that the rotating beam describes a plane of propagation around the device.

A problem with these known devices is that they require very accurate manufacturing so that the rotating parts do not angle the light beam incorrectly during the rotation. Additionally, at least one motor is needed to rotate them.

Another problem is that they are provided within four windows, which lead to four corner pillars for the holding of the windows, which blocks the propagation of the light plane. An attempt to get away from the problem with rotating parts and motors has been done in U.S. Pat. No. 3,820,903. In that the rotating parts have been replaced by a conical, reflecting prism which deflects a laser beam 90° so that a plane is formed 360° around the prism.

A problem connected with the use of a reflecting cone is that the device becomes very sensitive to angle deviations of the cone relative the incoming light beam since a small angle deviation there is enlarged in the plane of propagation, see FIG. 1b. The angle error will be doubled according to the law of reflection. A small angle error may at long distance give large position errors.

SUMMARY OF THE INVENTION

These problems are solved by means of a device according to claim 1. The advantage with this solution is that a double reflecting component is almost totally unsensitive to mounting errors. A rotationally symmetric double reflecting component works in analogy with a so called pentaprism. In a pentaprism, the angle between incoming and outgoing beam is fix irrespective the translation sideways or tilting. A body with two mutually fixedly connected reflecting surfaces with a mutual angle relation $\alpha$ deflects an incoming beam $2\alpha$, i.e. the double mutual angle relation of the reflecting surface, irrespective the incoming angle (FIG. 1b).

When the body is turned an angle $\beta$ in the plane of propagation for the beams, the beam will be deflected $2\beta$ at the first reflection. This deflection is compensated at the reflection in the second surface, which also has been turned the same angle $\beta$. The reasoning may be repeated for a further pair of reflecting surfaces. The independence of the incoming angle for the deflection thus concerns mirror bodies with an arbitrary even number of reflecting surfaces, i.e. components with a reflection in each of an even number of surfaces, hereafter called double reflecting components.

Another advantage is that the need for any rotating parts or motors is eliminated. Additionally, the deflection of the light beam and the windows are combined in the same detail, namely the double reflecting component.

Preferably, means is provided in the path of the beam between the light emitter and the double reflecting component with which the incoming angle of the light towards the double reflecting component may be adjusted, which in turn affect the angle of the plane of propagation out of the double reflecting component. It is of course a great advantage that the one and same device in an easy way may be set to generate a horizontal plane or a conical plane of propagation angled in a desired angle (upwards or downwards).

This can be done in several possible ways. One way is to position one or two axicons coaxially where at least one axicon is displacebly mounted along one axis which coincides with the centre axis of the double reflecting component. An axial displacement of one axicon changes the size of the ring in the common focal plane of the lenses. In such a way the angle of the collimated beam cone is changed.

An axicon confers some image errors. These can be compensated by the use of two axicons with cone angles of opposite signs.

Another way is to provide a zoom lens coaxially with the double reflecting component. The size of the ring can then be constant. The angle of the cone is changed during zooming since the focal length of the zoom lens is changed.

Preferably the collimated emitter emits light in the form of a ring or a portion or portions of a ring, for example, by means of refractive or diffractive axicons or axicons of Fresnel type. If a totally surrounding beaming plan is not desired, also portion or portions of the double reflecting component be blocked from light.

Another embodiment shows the use of an electrically driven two-axes micro mechanical mirror. The collimated light hits the mirror which is angled in such fashion that the light beam describes the mantle of a cone, i.e. so that a ring is drawn in the double reflecting component.

SHORT DESCRIPTION OF THE DRAWINGS

FIG. 1 a+b shows a reflecting component according to known art and its problem.

FIG. 2 a+b shows the function of a double reflecting component according to the invention.

FIG. 3 shows an arrangement of the invention according to a first embodiment for setting of a desired angle of the plane of propagation in a first position. The light image in the focal plane is shown underneath the Figure.

FIG. 4 shows the arrangement in FIG. 3 in a second position. The corresponding light image is shown underneath the Figure.

FIG. 7 shows an arrangement of the invention according to a third embodiment for setting of a desired angle of the plane of propagation in a first position. The light image is shown underneath the Figure.

FIG. 8 shows the arrangement in FIG. 7 in a second position. The corresponding light image is shown underneath the Figure.

FIG. 9 shows an arrangement of the invention according to a fourth embodiment for setting of a desired angle of the plane of propagation in a first position. The light image is shown underneath the Figure.

FIG. 10 shows the arrangement in FIG. 7 with another setting which gives a partial light image.

FIG. 11 shows an example of how the beam path can go into a double reflecting component. After the focal plane only the central beams of the bunch of beams, so called main beams, are shown due to clarity.

DETAILED DESCRIPTION OF PREFERRED EMBODIMENTS OF THE INVENTION

Figure 1A:
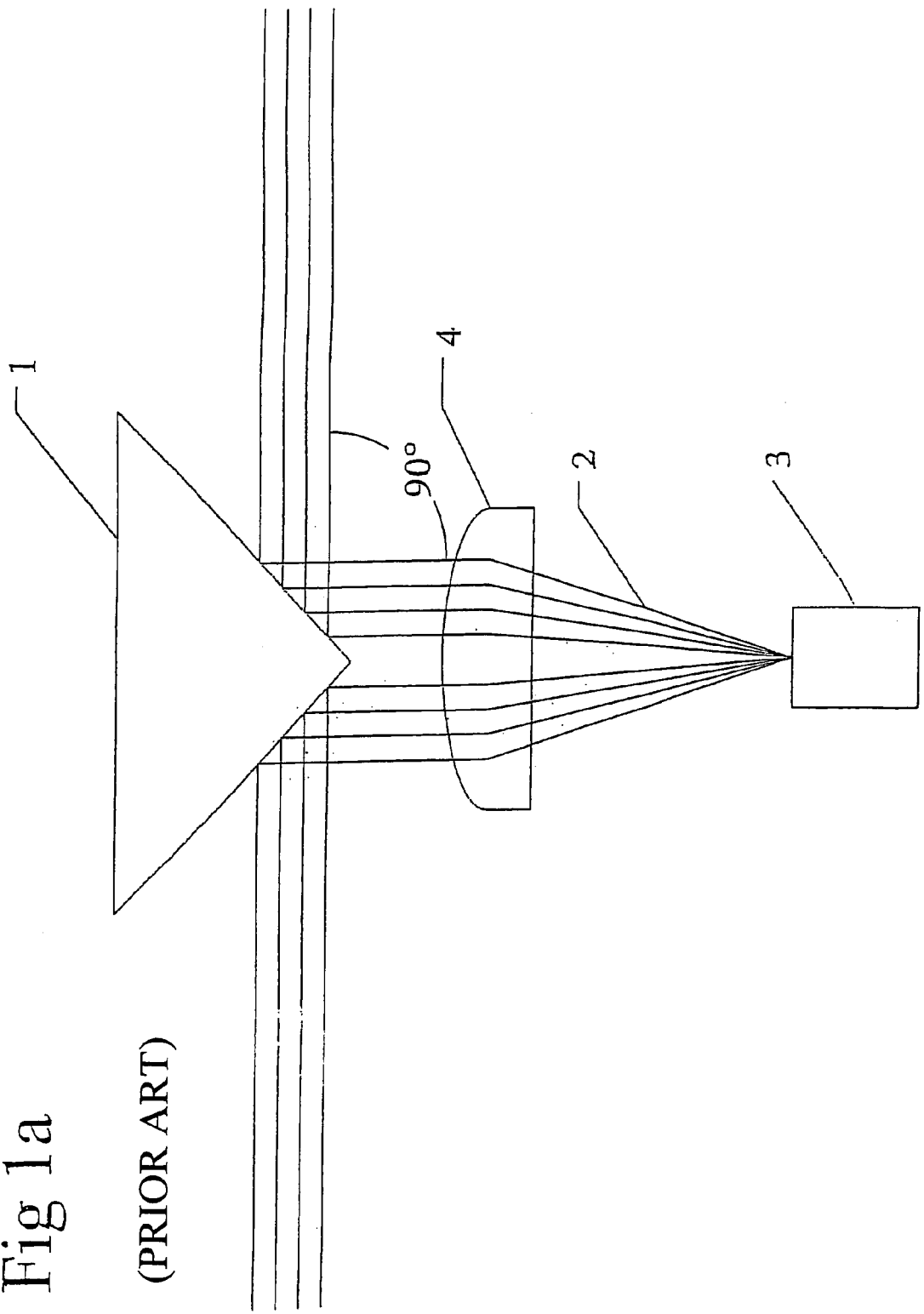
Figure 1B:
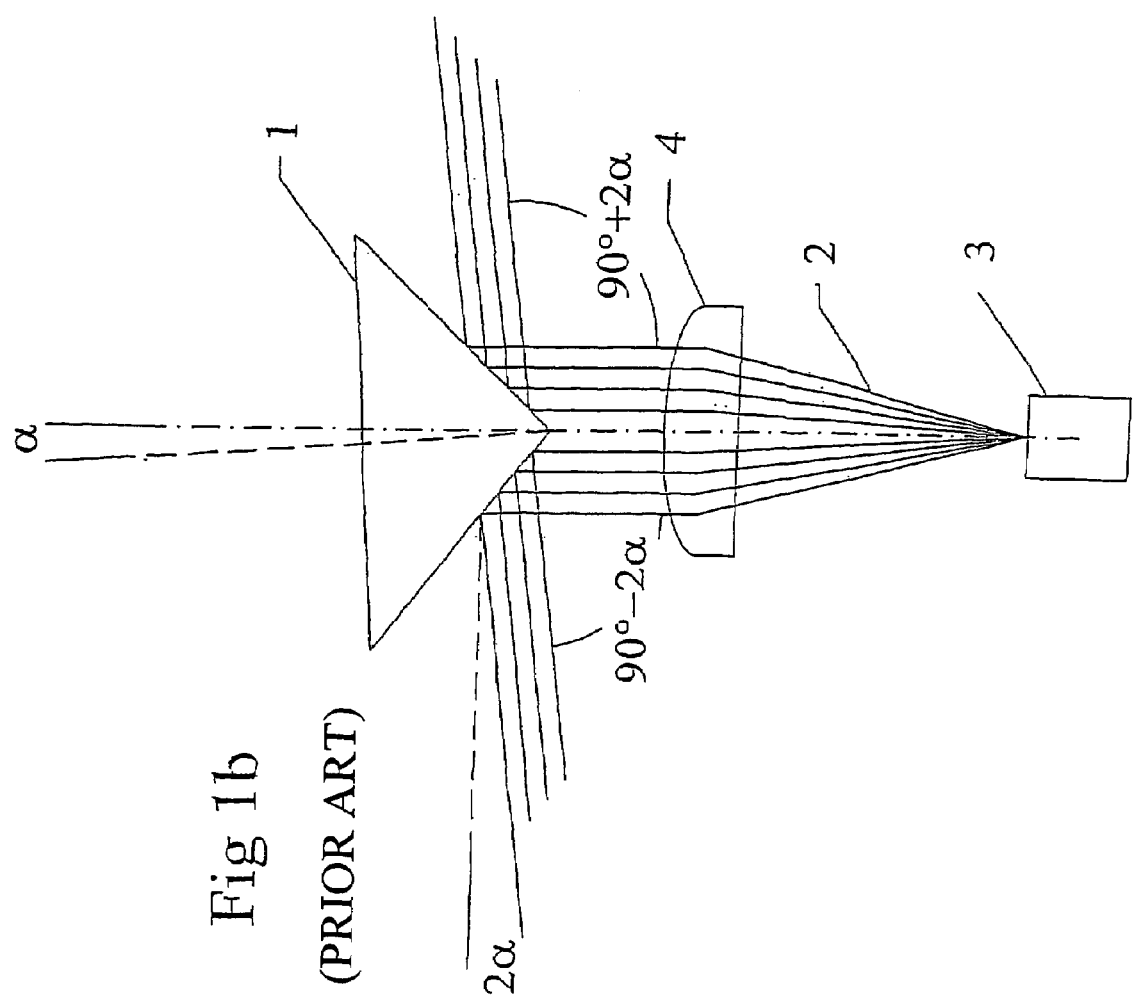

FIG. 1a shows known art with a conical prism 1 which deflects light beams 2 with 90°, which is emitted from an emitter 3 collimated by a focusing lens or a collimator 4. FIG. 1b shows the influence of a erroneous mounting of the prism 1 in FIG. 1a. An error angle α of the prism 1 gives an angle deviation 2α for the beams 2.

Figure 2A:
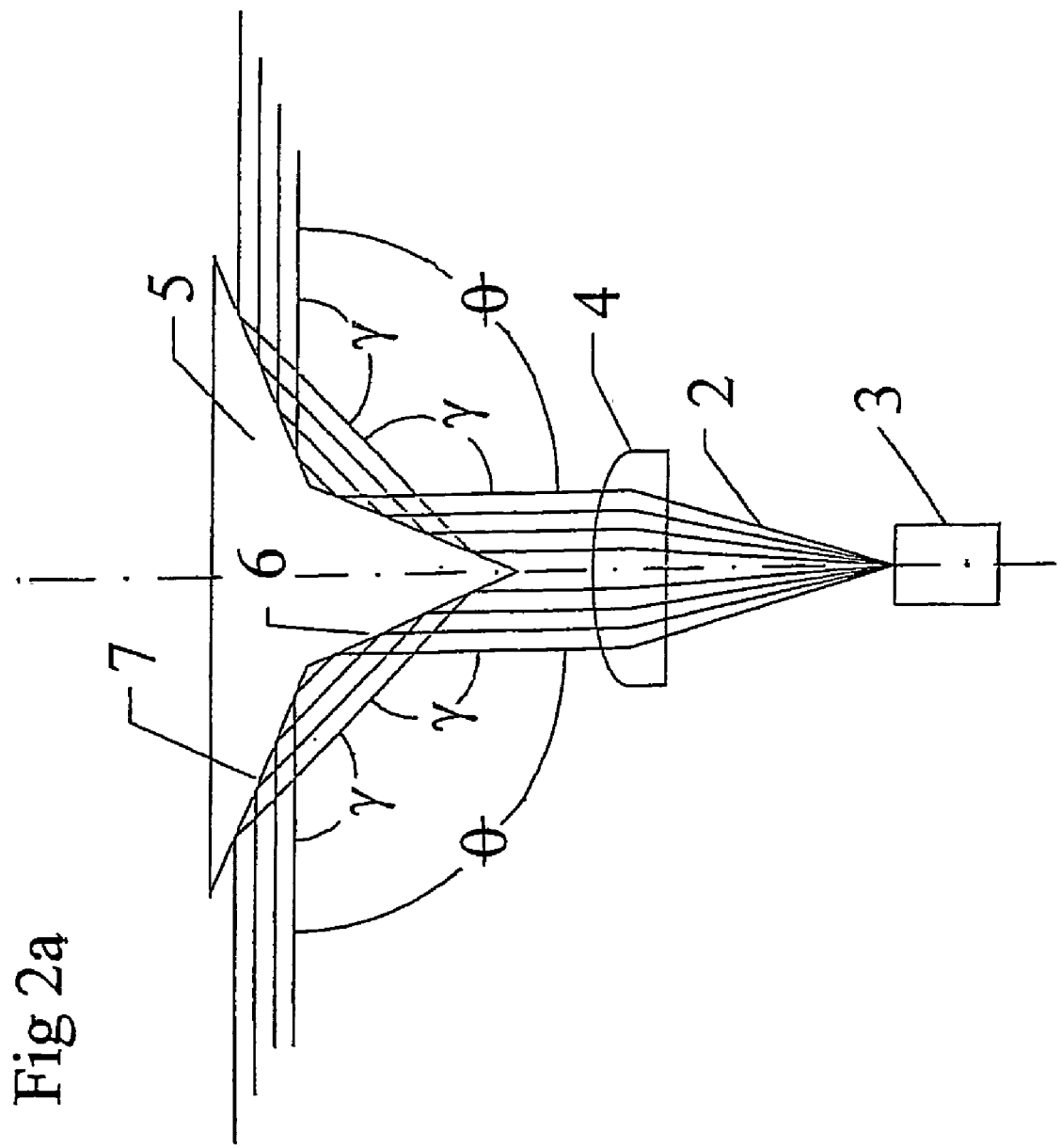

In FIG. 2a an arrangement with a double reflecting component 5 according to the invention is shown. The beams 2 hit a first reflecting surface 6 and are deflected with an angle γ. The beams are then reflected by a second reflecting surface 7 and are deflected then a with an angle γ. The angle θ between the incoming and outgoing beam 2 is fix irrespective translation sideways or tilting, see FIG. 2b.

Of course, both of the reflections does not have to be of the same size, instead the double reflecting component 5 may be designed so that the first surface reflects in a smaller angle and the second surface reflects in a larger angle or vice versa.

In FIG. 2b the double reflecting component 5 is erroneously mounted with an angle β the plane of the drawing. On the right side of the drawing the beams 2 hit the first reflecting surface 6 and are deflected with an angle γ+2β. Thereafter, the beams 2 are reflected in the second reflecting surface 7 and are deflected with an angle γ−2β. Thus, the angle between the incoming and outgoing beam 2 become θ since the errors even each other out.

On the left side of the Figure the beams 2 hit the first reflecting surface 6 and are deflected with the angle γ−2β. Thereafter the beams 2 are reflected in the second reflecting surface 7 and are deflected with an angle γ+2β. Totally the angle between the incoming and outgoing beam 2 is also θ on this side.

Since the double reflecting component 5 is rotationally symmetric it will be a continuous transition of the erroneous deflection (2β and −2β, respectively) from the extreme position on the right side via no erroneous angle orthogonally to the plane of the drawing (i.e. the beam 2 is deflected with γ in the first and the second surface) to the extreme position on the left side in the Figure (−2β and 2β, respectively) but the total angle between incoming and outgoing and will always be θ around the double reflecting component 5.

In FIG. 3 an arrangement according to a first embodiment for the possibility to change the angle of the plane of propagation from a double reflecting component (not shown in this Figure) is shown. An emitter 3 emits light beams 2 which are collimated in a focusing lens or collimator 4. Thereafter the light beams enter into a movably mounted axicon 8, which can be refractive, diffractive or of Fresnel type.

In a focal plane 10 the beams have joined each other and formed a ring of light 11, see the image directly underneath the arrangement. Preferably, the beam path in the middle image is telecentric, i.e. the main beams are parallel with the optical axis. With such an arrangement the resulting cone angle will become unsensitive to small focusing errors between the lenses. Thereafter is a second collimating lens 12 provided, which deflects the beams 2 to a leave pupil 13. Preferably, the double reflecting component 5 is arranged so that the leave pupil 13 ends up within the double reflecting component 5. All comprising parts are arranged coaxially to each other.

In FIG. 4 the same arrangement is shown as in FIG. 3 but the axicon 8 have been displaced closer to the focusing lens or collimator 4 along the common axis. In such a way a light ring 11 is formed having a larger diameter in the focal plane 10, see the image underneath the arrangement. The light beams 2 will thereafter go further through the collimating lens 12 and there be refracted in a greater angle than at the shown setting in FIG. 3.

The axicon may be interchangeable if so desired in order to thus be able to change the size of the light ring in the focal plane.

Thereby, the double reflecting component 5 will be hit by light beams with another incoming angle than present according to the setting in FIG. 3 having the result that the plane of propagation from the double reflecting component 5 will have another angle than at the setting according to FIG. 3.

Figure 5:
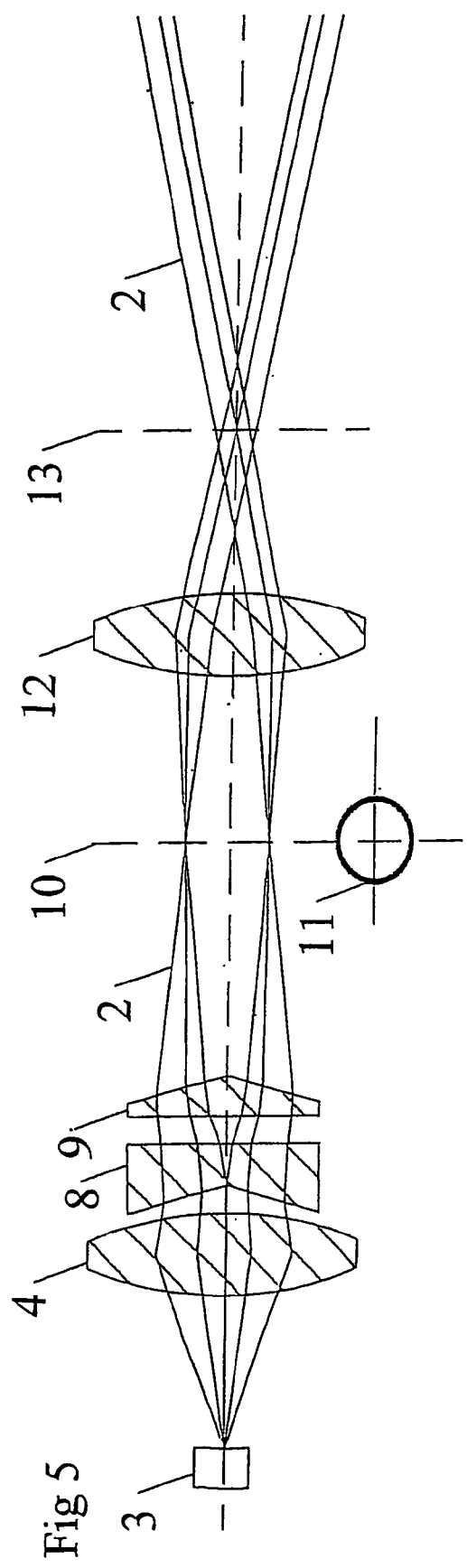
FIG. 5 shows an arrangement of the invention according to a second embodiment for setting of a desired angle of the plane of propagation in a first position. The light image is shown underneath the Figure.

In FIG. 5 an arrangement according to a second embodiment for the possibility of changing the angle of the plane of propagation from a double reflecting component (not shown in this Figure) is shown. An emitter 3 emits light beams 2 which are collimated in a focusing lens or collimator 4. Thereafter the light beams enter a first fixedly mounted axicon 8, which may be refractive, diffractive or of Fresnel type, and further through a second movably mounted axicon 9 which also may be refractive, diffractive or of Fresnel type.

In a focal plane 10 the beams have converged and formed a ring of light 11, see the image directly underneath the arrangement. Preferably the beam path in the middle image is telecentric, i.e. the main beams are parallel to the optical axis. With such an arrangement the resulting cone angle is unsensitive to small focusing errors between the lenses. Thereafter a second collimated lens 12 is provided which deflects the beams 2 to a leave pupil 13. Preferably the double reflecting component 5 is arranged so that the leave pupil 13 is within the double reflecting component 5. All parts comprised are coaxially arranged to each other.

Figure 6:
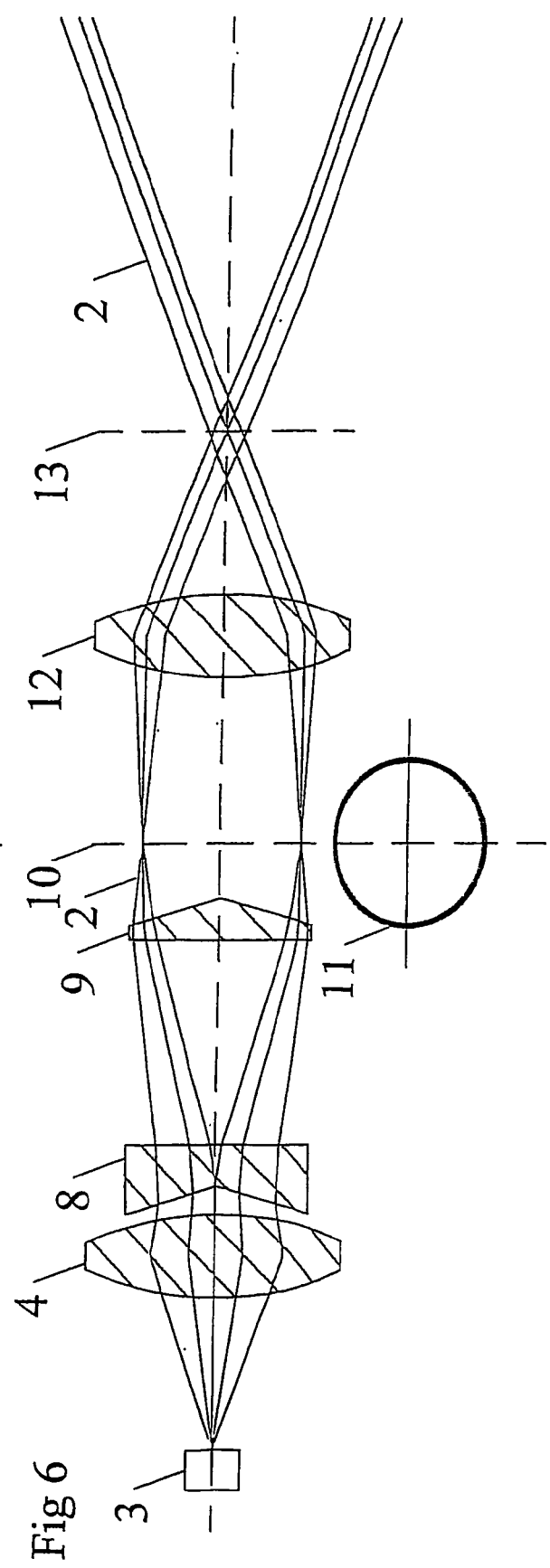
FIG. 6 shows the arrangement in FIG. 5 in a second position. The corresponding light image is shown underneath the Figure.

In FIG. 6 the same arrangement as in FIG. 5 is shown but the second axicon 9 have been displaced away from the fixedly mounted axicon 8 along the common axis. In such a way a light ring 11 is formed having a larger diameter in the focal plane 10, see the image underneath the arrangement. The light beams 2 thereafter run further through the collimating lens 12 and is refracted there with a greater angle than at the shown setting in FIG. 5.

Thus, the double reflecting component 5 is hit by light beams having another incoming angle than present in the setting in FIG. 7 giving the result that the plane of propagation from the double reflecting component 5 will have another angle than at the setting according to FIG. 5.

With the arrangement according to FIGS. 3-6 the plane of propagation may be set from a determined angle downwards so that a downwards angled conical plane of propagation is formed via a flat horizontal plane of propagation (without angle) to a determined angle upwards so that an upwards angled conical plane of propagation is formed.

In FIG. 7 another arrangement is shown according to a third embodiment for the possibility to be able to set the angle of the plane of propagation of the beams 2 from the double reflecting component 5. The arrangement comprises an emitter 3, collimator 4 and one or two fixed axicons 8, 9 for the forming of the light image 11 in the focal plane 10, in this case a circle, see the image underneath the arrangement.

Further, a zoom lens 14 is comprised with which the outgoing angle of the beams 2 may be set. All parts comprised are coaxially arranged. With the setting of the zoom lens the outgoing angle of the beams are changed.

In FIG. 8 the zoom lens 14 has another setting so that the outgoing angle of the beams 2 from the zoom lens 14 is different. In such a way the incoming angle of the beams 2 to the double reflecting component 5 may be set giving the result that the angle of the plane of propagation may be set.

In FIG. 9 a further arrangement is shown according to the invention. Also here the parts comprised are coaxially arranged. The arrangement comprises an emitter 3, collimator 4 and a diffractive light image generator 15, which, for example, provides three different rings 11 with different diameters.

The rings may be distinguished from each other with different patterns, such as shown underneath the arrangement, having a inner dotted ring, a full middle ring and a broken line for the outer ring or in any other way, such as different colours of the light rings 11.

The beams 2 in the different light images 11 have different diameters and hit a collimated lens 12, whereby they are reflected in different angles so that they will have different incoming angles in the double reflecting component 5 and thus give differently angled plans of propagation from the double reflecting component 5.

For example, the middle light ring may give a flat horizontal plane of propagation and the two other light rings a downwards directed and an upwards directed, respectively, conical plane of propagation, for example, 1° upwards and downwards, respectively.

In FIG. 10 it is shown that partial beam images 11 also may be formed if desired by means of, for example, a diffractive component. This may also be obtained by masking the double reflecting component 5 so that the beams 2 will be stopped and the plane of propagation will not become totally surrounding.

In FIG. 11 it is shown an embodiment of the invention according to FIG. 5 where also the double reflecting component 5 is shown. The path of the beams 2 through the double reflecting component 5 is also shown. If three different light images 11 are present in the focal plane 10 they form three different planes of propagation 17.

If these planes in imagination are sketched 18 towards the centre axis they will meet in a central point 16. This central point operates as a conceived "hinge" or "hub" from which one or several planes of propagation 17 in imagination starts and may be inclined upwards or downward from there.

Figure 12:
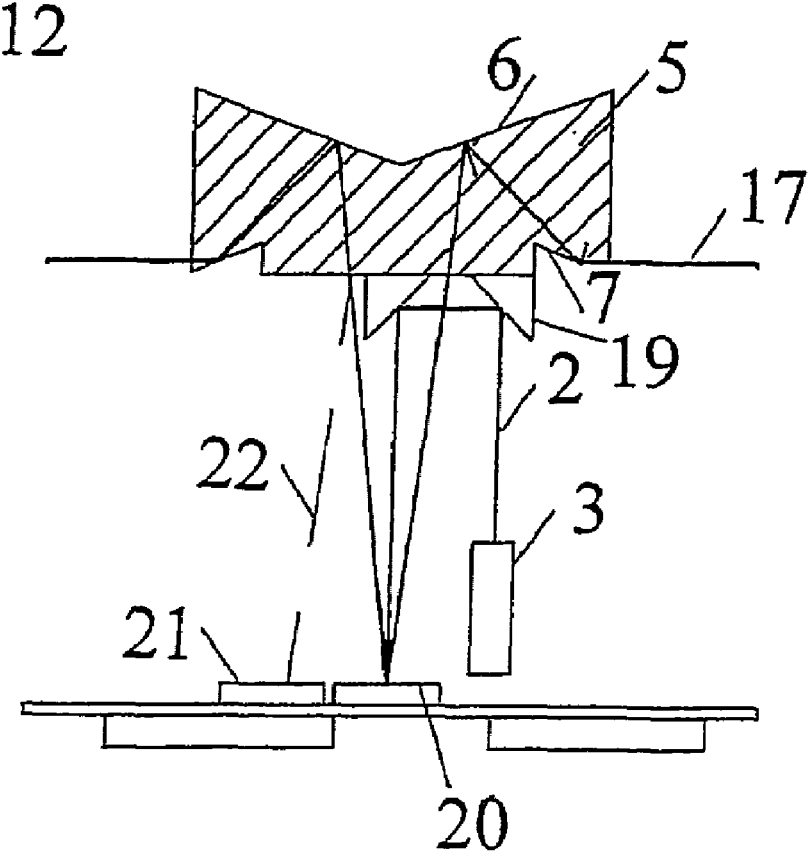
FIG. 12 shows a first embodiment of the invention with a two-axes micromechanical mirror seen from the side.

In FIG. 12 another embodiment of the invention is shown, which uses an electrically driven two-axes micro-mechanical mirror 20. A collimated light beam 2 from an emitter 3 hits the mirror 20, which is angled by means of electronics (not shown) so that the light beam 2 describes the mouth of a cone, i.e. that a ring is drawn in the double reflecting component 5.

Figure 13:
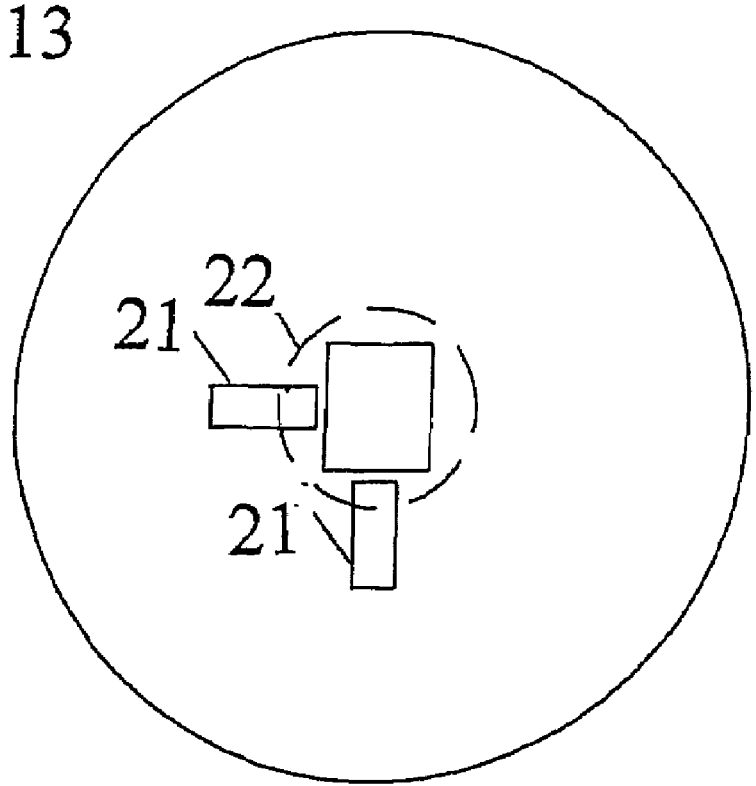
FIG. 13 shows the embodiment of FIG. 10 from above.

A certain portion 22 of the light beam 2 is reflected in the bottom of the double reflecting component 5 and falls in on two photodiode arrays 21 provided orthogonally to each other, see FIG. 13. In such a way a feedback is provided so that adjustments may be done by means of electronics (not shown) of the ring of light and the centering of the same.

Figure 14:
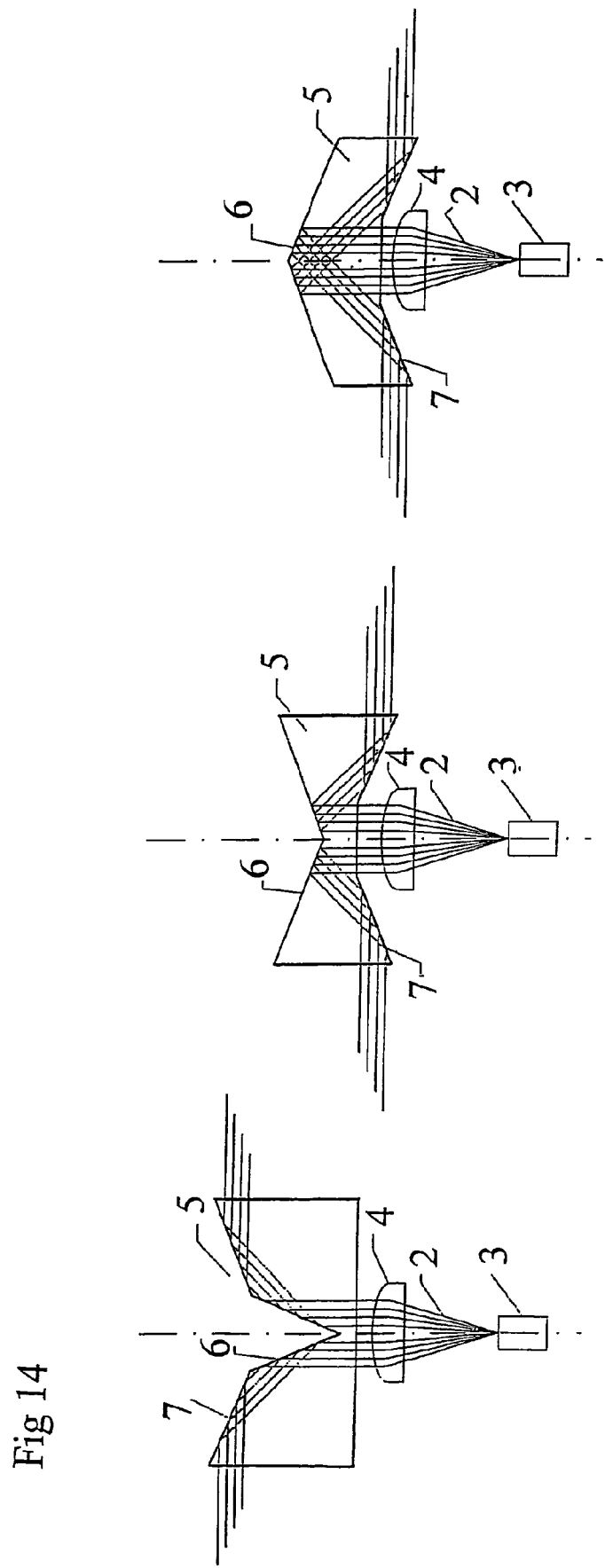
FIG. 14 shows a number of embodiments of the double reflecting component.

In FIG. 14 a number of different arcs are shown, as an example.

Figure 15:
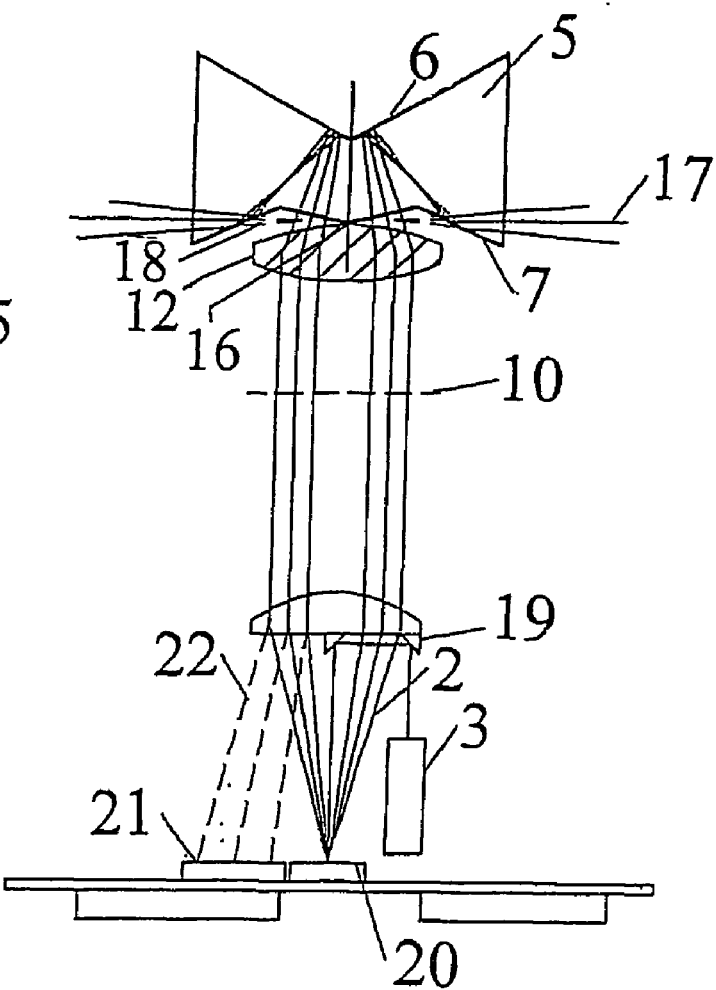
FIG. 15 shows a second embodiment of the invention with a two-axes micromechanical mirror seen from the side.
Figure 16:
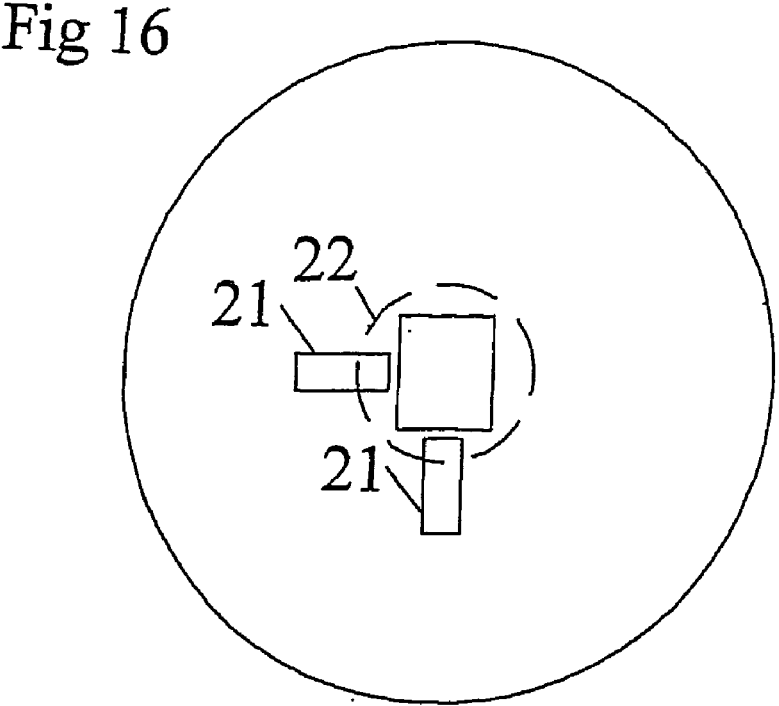
FIG. 16 shows the embodiment in FIG. 15 from above.

In FIG. 15 a second embodiment of the variant of the invention as in FIG. 12 is shown. There the possibility to use one or two axicons between the micromechanical mirror 20 and the double reflecting component 5 is shown. It is also possible to instead use a zoom lens there in-between.

This invention claimed is:

1. A device for converting light from a laser, VCSEL (vertical cavity surface emitting laser) or light emitting diode/diodes to a plane of propagation, comprising a collimated or focused light emitter (3), characterized in that a full or a portion or several portions of a rotationally symmetric double reflecting component (5) is fixedly provided coaxially in the path of beams (2) from the collimated or focused light emitter (3) so that the light is deflected in a desired angled plane of propagation (17) which extends up to 360° around the double reflecting component (5).

2. A device according to claim 1, wherein settable means (8, 9, 14, 20, 21) is provided in the path of beams (2) between the collimated light emitter (3) and the double reflecting component (5), the setting of the means (8, 9, 14, 20, 21) determines the incoming angle of the light (2) towards the double reflecting component (5) and thus the angle of the plane of propagation (17).

3. A device according to claim 1, wherein the settable means comprises one or several coaxially arranged axicons (8, 9) where at least one is displaceably provided (9) along an axis which is common with the axis of the double reflecting component (5).

4. A device according to claim 3, wherein the axicons (8, 9) are refractive, diffractive or of Fresnel type.

5. A device according to claim 1, wherein the settable means is a zoom lens (14) coaxially arranged with the double reflecting component (5).

6. A device according to claim 1, wherein the collimated emitter (3) emits light (2) in the shape of a ring (11) or that a component of refractive, diffractive or Fresnel type is provided in order to form the light into a desired shape.

7. A device according to claim 1, wherein a certain portion or portions of the double reflecting component (5) is blocked from light (2) so that a portion or portions of the plane of propagation (17) is eliminated.

8. A device according to claim 1, herein an electrically driven two-axes micromechanical mirror (20) is hit by the collimated light (2), which mirror (20) is operable so that the light beam (2) is deflected in such a way that it describes the mantle surface of a cone, which is passed on to the double reflecting component (5).

* * * * *